US011995187B1

(12) United States Patent
Selvakumaran et al.

(10) Patent No.: US 11,995,187 B1
(45) Date of Patent: May 28, 2024

(54) SYSTEMS AND METHODS FOR A COMPREHENSIVE AND EFFICIENT SIMULATION-BASED METHODOLOGY ON IP AUTHENTICATION AND TROJAN DETECTION

(71) Applicant: ANSYS, INC., Canonsburg, PA (US)

(72) Inventors: Dinesh Kumar Selvakumaran, Pflugerville, TX (US); Deqi Zhu, San Jose, CA (US); Lang Lin, Cupertino, CA (US); Norman Chang, Fremont, CA (US); Hsiming Pan, San Jose, CA (US)

(73) Assignee: ANSYS, INC., Canonsburg, PA (US)

( * ) Notice: Subject to any disclaimer, the term of this patent is extended or adjusted under 35 U.S.C. 154(b) by 806 days.

(21) Appl. No.: 17/103,434

(22) Filed: Nov. 24, 2020

Related U.S. Application Data

(60) Provisional application No. 63/068,260, filed on Aug. 20, 2020.

(51) Int. Cl.
*G06F 21/56* (2013.01)
*G06F 1/20* (2006.01)
*G06F 30/367* (2020.01)
*G06F 30/373* (2020.01)

(52) U.S. Cl.
CPC ............ *G06F 21/567* (2013.01); *G06F 1/206* (2013.01); *G06F 30/367* (2020.01); *G06F 30/373* (2020.01)

(58) Field of Classification Search
CPC ...... G06F 21/567; G06F 1/206; G06F 30/367; G06F 30/373
See application file for complete search history.

(56) References Cited

U.S. PATENT DOCUMENTS

| 10,579,757 | B1  |   | 3/2020 | Pan |  |
|---|---|---|---|---|---|
| 11,334,700 | B1 | * | 5/2022 | Wakefield | ............ G06F 30/367 |
| 11,366,947 | B2 |   | 6/2022 | Chang |  |
| 2016/0062422 | A1 | * | 3/2016 | Mittal | ............... H03K 19/0008 |
|  |  |  |  |  | 713/320 |
| 2021/0200915 | A1 |   | 7/2021 | Kumar |  |

OTHER PUBLICATIONS

Abdullah Nazma Nowroz, et al., "Novel Techniques for High-Sensitivity Hardware Trojan Detection Using Thermal and Power Maps," IEEE Transactions on Computer-Aided Design of Integrated Circuits and Systems, vol. 33, No. 12, Dec. 2014 (Year: 2014).*

* cited by examiner

*Primary Examiner* — Steven W Crabb
(74) *Attorney, Agent, or Firm* — Womble Bond Dickinson (US) LLP

(57) ABSTRACT

Methods, machine readable media and systems for a method to determine if a model of an integrated circuit (IC) includes a Trojan component are described. In one embodiment, a method can include the following operations: splitting the model of the IC into a plurality of tiles; simulating the IC with an elevated temperature of each tile to predetermined level; computing a temperature-dependent leakage power for each tile; and identifying a tile of the IC as including a Trojan component based on the temperature-dependent leakage power computed.

20 Claims, 8 Drawing Sheets

SYSTEMS AND METHODS FOR A COMPREHENSIVE AND EFFICIENT SIMULATION-BASED METHODOLOGY ON IP AUTHENTICATION AND TROJAN DETECTION

This application claims priority to and the benefit of U.S. provisional patent application No. 63/068,260, filed Aug. 20, 2020, the US provisional patent application being hereby incorporated herein by reference.

BACKGROUND

Due to the globalization of integrated circuit (IC) design and fabrication processes, ICs are becoming increasingly vulnerable to malicious activities and alterations. An adversary can introduce a Trojan designed to disable or destroy a system at some future time, or the Trojan could leak confidential information and secret keys covertly to the adversary. Multiple IC design teams with untrusted entities can provide Intellectual Property (IP) cores. The IP cores are designed by hundreds of IP vendors distributed across the world. Such IP cores cannot be assumed trusted as hardware Trojans can be maliciously inserted into them without disclosing to the IC integration entity. For example, a Hardware Trojan (HT) may be an intentional malicious modification of the IC aiming at leaking valuable data, degrading performance, or resulting in complete malfunction, e.g., denial-of-service. A HT may be inserted into a System-on-Chip (SoC) during different phases, such as an untrusted IP vendor, an untrusted physical design contractor and an untrusted foundry. Among the various HT insertion phases, trust and verification of third-party IPs (3PIPs) is one of the biggest challenges.

It is extremely difficult to detect Trojans in third-party IPs (3PIPs) simply with conventional verification methods, as well as, methods developed for detecting Trojans in fabricated ICs. Pre-silicon simulation is one of the approaches to ensure the authenticity of such IP cores. However, ensuring coverage in the detection of IP cores is very problematic. IP authentication has to cover different type of Trojans. Unfortunately, currently, there are not adequate methods that can detect Trojan varieties.

SUMMARY

In one embodiment, a machine implemented method to determine if a model of an integrated circuit (IC) includes a Trojan component, is disclosed. The method includes the following operations: splitting the model of the IC into a plurality of tiles; simulating the IC with an elevated temperature of each tile to a predetermined level; computing a temperature-dependent leakage power for each tile; and identifying a tile of the IC as including a Trojan component based on the temperature-dependent leakage power computed. In one embodiment, the IC is split into uniform tiles. In one embodiment, the temperature of the whole IC including all of the tiles is increased to the predetermined level. In one embodiment, for each tile, a change in temperature based upon the leakage power is computed and compared against a golden IP core, and if the change in temperature exceeds a predetermined threshold, the tile of the IC is identified as including a Trojan component. In one embodiment, significant changes in temperature beyond possible temperature changes from process variation are detected.

In one embodiment, a non-transitory machine readable medium storing executable program instructions which when executed by a data processing system cause the data processing system to perform a method to determine if a model of an integrated circuit (IC) includes a Trojan component, is disclosed. The method includes the following operations: splitting the model of the IC into a plurality of tiles; simulating the IC with an elevated temperature of each tile to a predetermined level; computing a temperature-dependent leakage power for each tile; and identifying a tile of the IC as including a Trojan component based on the temperature-dependent leakage power computed. In one embodiment, the IC is split into uniform tiles. In one embodiment, the temperature of the whole IC including all of the tiles is increased to the predetermined level. In one embodiment, for each tile, a change in temperature based upon the leakage power is computed and compared against a golden IP core, and if the change in temperature exceeds a predetermined threshold, the tile of the IC is identified as including a Trojan component. In one embodiment, significant changes in temperature beyond possible temperature changes from process variation are detected.

In one embodiment, a method to determine if a model of an integrated circuit (IC) having a device layer and a plurality of wires includes a Trojan component, is disclosed. The method includes the following operations: splitting the model of the IC into tiles; simulating the IC with an elevated temperature; calculating a change in temperature per tile for a wire of the IC based upon a joule-heating temperature change for the wire per tile, a change in temperature per tile for the wire of the IC based upon a joule-heating temperature change for a wire-wire thermal coupling per tile, and a thermal coupling temperature change between a device layer of the IC and the wire per tile; and identifying the IC as including a Trojan component based on the change in temperature for the wire computed. In one embodiment, the IC is split into uniform tiles. In one embodiment, the thermal coupling temperature change between the device layer of the IC and the wire is computed based upon a decay curve. In one embodiment, for each tile, if the change in the temperature for the wire computed compared against a golden core, exceeds a predetermined threshold, the wire of the tile of the IC is identified as including a Trojan component. In one embodiment, significant changes in temperature beyond possible temperature changes from process variation are detected.

In one embodiment, a non-transitory machine readable medium storing executable program instructions which when executed by a data processing system cause the data processing system to perform a method to determine if a model of an integrated circuit (IC) having a device layer and a plurality of wires includes a Trojan component, is disclosed. The method includes the following operations: splitting the model of the IC into tiles; simulating the IC with an elevated temperature; calculating a change in temperature per tile for a wire of the IC based upon a joule-heating temperature change for the wire per tile, a change in temperature per tile for a wire of the IC based upon a joule-heating temperature change for a wire-wire thermal coupling per tile, and a thermal coupling temperature change between a device layer of the IC and the wire per tile; and identifying the IC as including a Trojan component based on the change in temperature for the wire computed. In one embodiment, the IC is split into uniform tiles. In one embodiment, the thermal coupling temperature change between the device layer of the IC and the wire is computed based upon a decay curve. In one embodiment, for each tile, if the change in the temperature for the wire computed compared against a golden core, exceeds a predetermined threshold, the wire of the tile of the IC is identified as including a Trojan component. In one embodiment, significant changes in temperature beyond possible temperature changes from process variation are detected.

The aspects and embodiments described herein can include non-transitory machine readable media that can store executable computer program instructions that when executed cause one or more data processing systems to perform the methods described herein when the computer program instructions are executed. The instructions can be stored in non-transitory machine readable media such as in dynamic random access memory (DRAM) which is volatile memory or in nonvolatile memory, such as flash memory or other forms of memory.

The above summary does not include an exhaustive list of all embodiments are aspects in this disclosure. All systems, media, and methods can be practiced from all suitable combinations of the various aspects and embodiments summarized above and also those disclosed in the detailed description below.

BRIEF DESCRIPTION OF THE DRAWINGS

The present invention is illustrated by way of example and not limitation in the figures of the accompanying drawings in which like references indicate similar elements.

DETAILED DESCRIPTION

Figure 1:
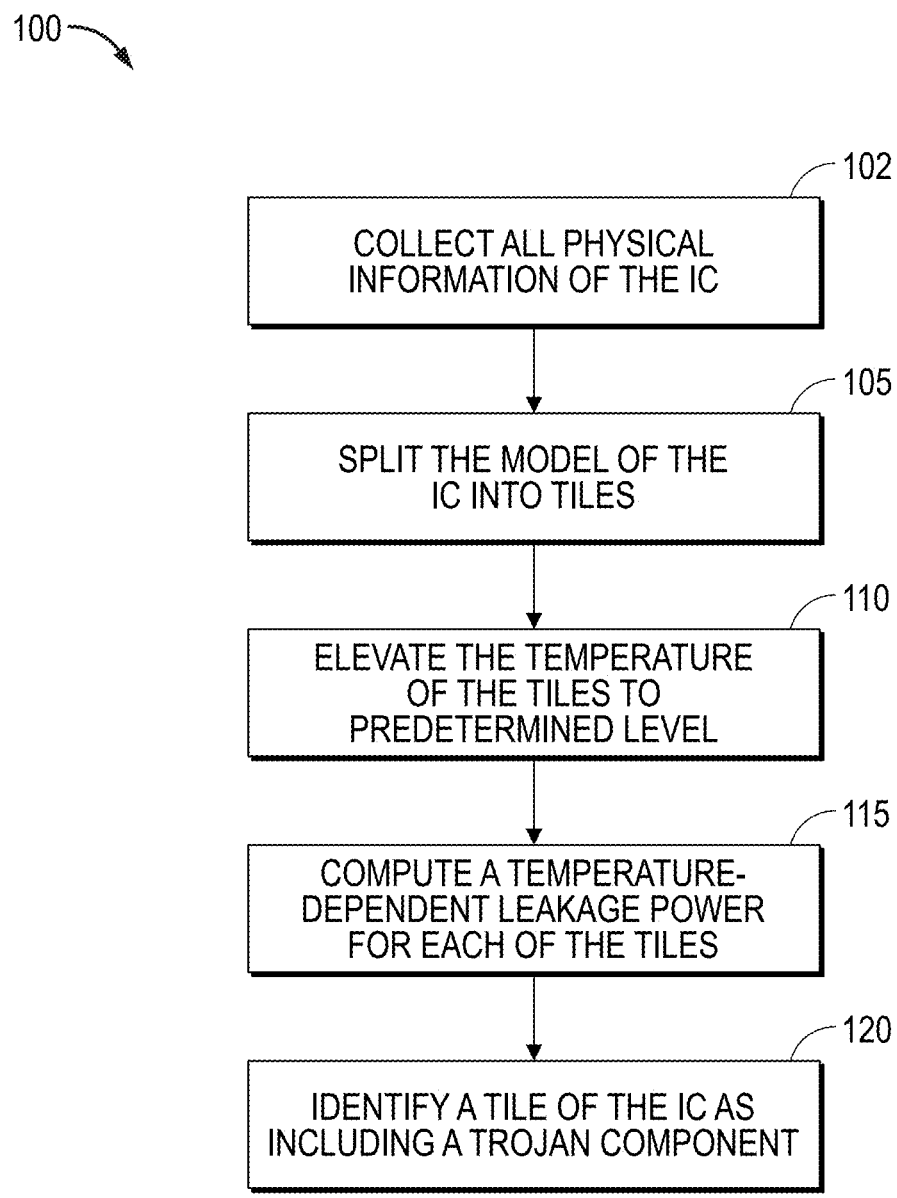
FIG. 1 shows a flow chart of a method to determine if a Trojan component is present according to one embodiment.

Various embodiments and aspects will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments.

Reference in the specification to "one embodiment" or "an embodiment" means that a particular feature, structure, or characteristic described in conjunction with the embodiment can be included in at least one embodiment. The appearances of the phrase "in one embodiment" in various places in the specification do not necessarily all refer to the same embodiment. The processes depicted in the figures that follow are performed by processing logic that comprises hardware (e.g. circuitry, dedicated logic, etc.), software, or a combination of both. Although the processes are described below in terms of some sequential operations, it should be appreciated that some of the operations described may be performed in a different order. Moreover, some operations may be performed in parallel rather than sequentially.

Embodiments described herein relate to systems and methods for a comprehensive and efficient simulation-based methodology for Intellectual Property (IP) core authentication and Trojan detection for IP cores. A Trojan scenario based solution is utilized for IP authentication. It should be appreciated that the solutions for the, to be described scenarios, are under the assumption that a golden IP core (e.g., that is Trojan Free) simulation is available. It should be appreciated that the terms integrated circuit (IC) and IP core are used interchangeably.

Looking broadly at the to be described scenarios, in the first scenario, an IP core under test and the golden IP core (Trojan Free) has no layout difference. Further, a Trojan may or may not be activated with given test vectors. In this first scenario, the IP core will be split into very small tiles. Each tile will be elevated with a very high temperature (e.g., 200° C.). With the very high temperature, leakage power becomes very dominant because leakage power is increased exponentially with Temperature increase. Therefore, there will be significant change in temperature due to the leakage power. This Delta-T (i.e., change in temperature) is captured for each tile and a thermal map may be constructed. The same procedure is followed for both the golden IP core and IP core under test. The leakage power based delta-T maps will be compared. If there is a significant Delta-T difference in certain tile(s) beyond the typical Temp variation from process variation, then there is Trojan. If not, then the IP core can be trusted.

In a second scenario, a wire based implementation is used, in which, given a very high temperature condition, the temperature of each wire segment with thermal impact from underneath devices and neighboring wires will be calculated for both a golden IP core and an IP core under test (e.g., that may be a malicious IP core). In the second scenario, a Trojan may be inserted by changing the metal layers. A modified per wire temperature on a malicious IP core can be obtained to detect metal manipulations by comparison with the wire temperature on the golden IP core.

With reference to FIG. 1, operation steps of a method 100 of scenario 1 in a flowchart will be described, to illustrate a method of determining if a model of an integrated circuit (IC) includes a Trojan component. At operation 102, all of the physical information of the IC is collected. As an example, all of the physical design data inputs of the modeled IC such as library exchange format/design exchange format/graphic design system may be read and used in programs such as SPICE (LEF/DEF/GDS/lib/spice model, etc.). Next, at operation 105, the model of IC may split into a plurality of tiles. For example, the IC core may be uniformly divided into multiple small tiles. In one example, the IC may split into uniform tiles. As one particular example, the tiles may be as small as 1 um×1 um.

Next, at operation 110, the IC is simulated to elevate the temperature of the tiles to a predetermined level. As an example, for each tile, the temperature is elevated. As an example, the temperature of the whole IC including all of the tiles is increased to the predetermined level. At operation 115, the temperature-dependent leakage power is computed for each tile and, based upon this, the change in temperature (Delta-T) for each tile can be calculated. The temp-dependent leakage power of each tile can be pre-characterized using SPICE. As will be described, based on the temperature-dependent leakage power and the change in temperature (Delta-T) for each tile computed, the tile of an IC may be identified as including a Trojan component (operation 120).

As will be described, in one embodiment, for each tile, a change in temperature based upon the leakage power is computed and compared against a golden IP core/IC, and if the change in temperature exceeds a predetermined threshold, the tile of the tested IP core/IC is identified as including a Trojan component. In one embodiment, significant changes in temperature beyond possible temperature changes from process variation are detected.

Figure 2:
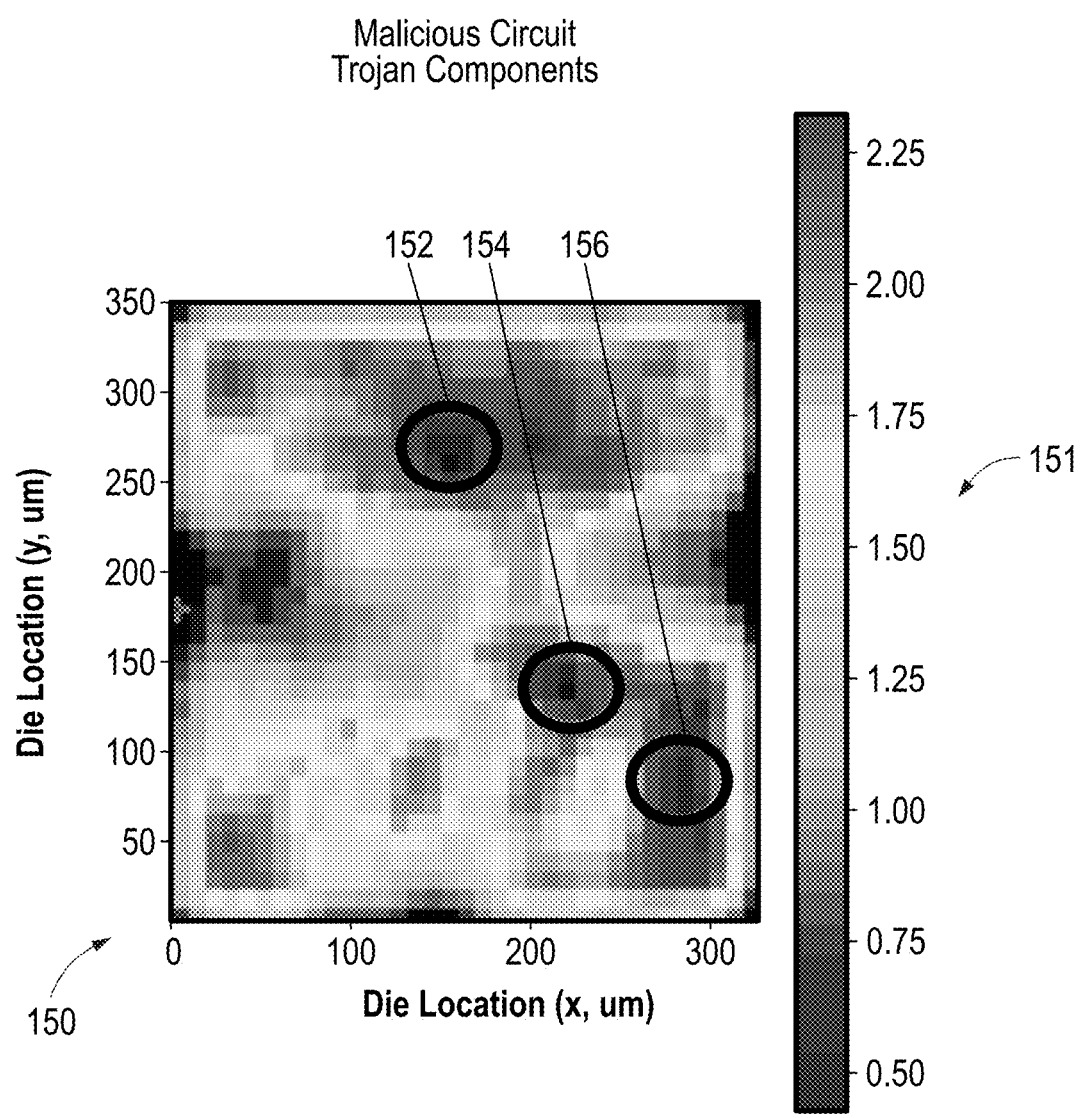
FIG. 2 show a heat map example of a tested IP core that has been raised to an elevated temperature for the identification of tiles that may include a Trojan component according to one embodiment.

With additional reference to FIG. 2, an example of a tested IP core/IC via simulation is shown that has been raised to an elevated temperature for the identification of tiles that may include a Trojan component. As can be seen in FIG. 2, a tested IP core/IC 150 is shown that has been raised to an elevated temperature. The tested IP core/IC 150 is split into a plurality of tiles. Die location along the x and y axis is shown divided in micrometers (um). As one example, each tile may be 1 um by 1 um. In this simulation, the Delta-T difference checking is done for all the tiles and therefore a complete analysis can be performed for the third party IC under test. In particular, the Delta-T for each tile can be calculated for both the golden IP core/IC and the tested potentially malicious IP core/IC. For each tile, Delta-T will be compared between the golden IP core/IC and the tested IP core/IC and checked if the corresponding Delta-T difference of a certain tile is beyond the doubt of process variation. If the Delta-T difference is significant beyond process variation, a Hardware Trojan may have been inserted. As shown in this example, in FIG. 2, tile areas 152, 154, and 156 show Delta-T differences of at least 2.25° C., which, shows that Trojan components have been inserted. The gray scale chart 151 shows varying Delta-T differences. Therefore, the tested IP core/IC is identified as a malicious IP core/IC.

Accordingly, as described in FIG. 2, for each tile, a change in temperature is computed and compared against a golden IP core/IC, and if the temperature exceeds a predetermined threshold (e.g., 2.25° C.), the tile of the tested IP core/IC is identified as including a Trojan component and the tested IP core/IC is identified as a malicious IP core/IC. One example implementation of calculating Delta-T differences per tile is described in U.S. patent application Ser. No. 16/709,746, hereby incorporated by reference, however, any suitable method may be used. Also, in one embodiment, significant Delta-T differences beyond possible temperature changes from process variation are detected for confirming a Trojan.

Figure 3:
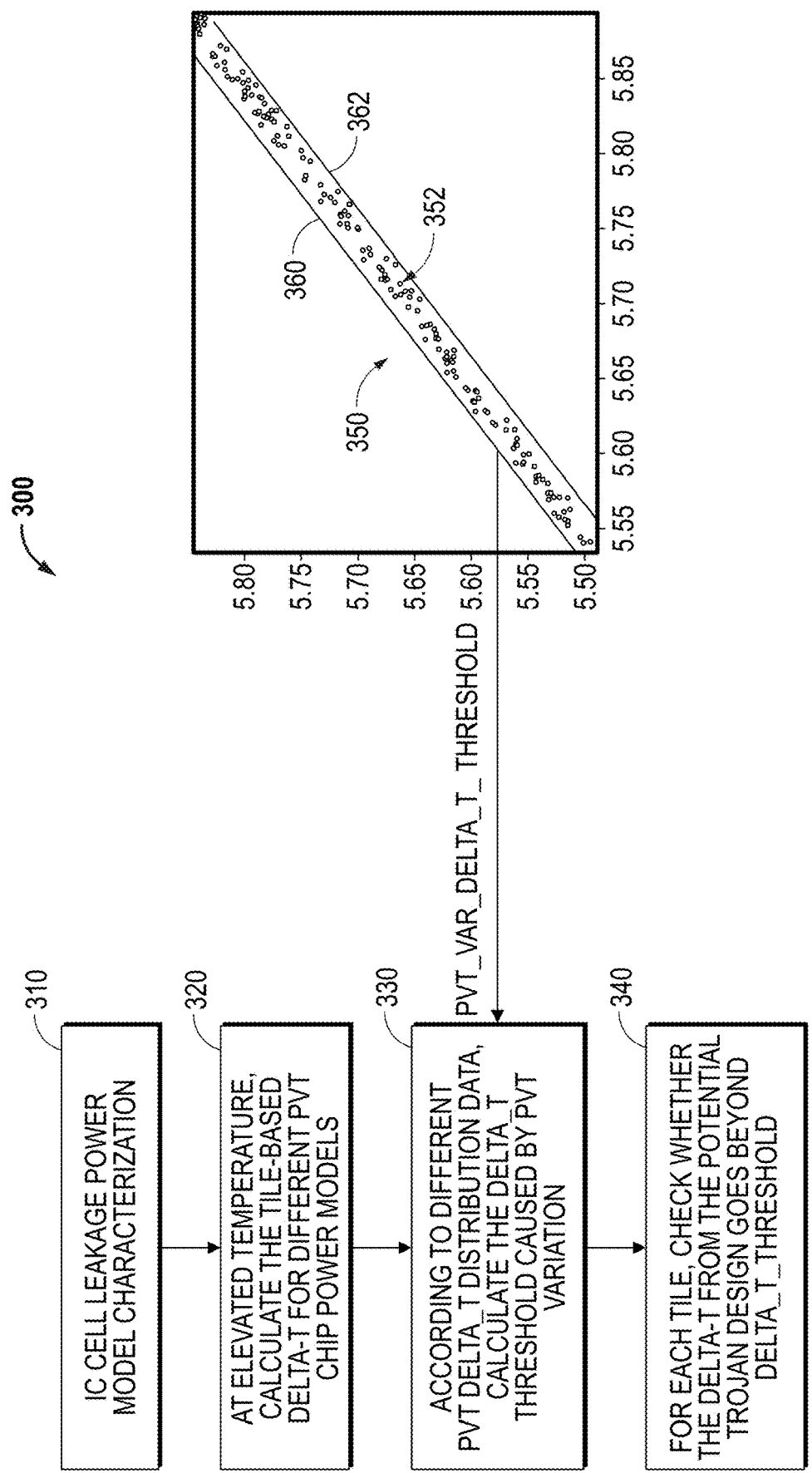
FIG. 3 shows a flowchart and a graph that illustrate a method to detect for significant Delta-T temperature differences beyond possible temperatures changes from process variation according to one embodiment.

With reference to FIG. 3, FIG. 3 shows a flowchart and a graph that illustrate a method 300 to detect for significant Delta-T temperature differences beyond possible temperatures changes from process variation. At operation 310, an IC leakage power model characterization is performed. Based upon this, at operation 320, at an elevated temperature, a tile-based change in temperature (Delta-T) for different process voltage temperature (PVT) chip power models is performed. For example, this may illustrated by the below equations:

$$F(\text{tile\_basedpower\_}PVT1) = \text{Tile\_based\_delta\_}t\_PVT1$$

$$F(\text{tile\_basedpower\_}PVT2) = \text{Tile\_based\_delta\_}t\_PVT2$$

in which, functions of tile-based-power for different process voltage temperatures (PVT1, and PVT2) are used. Of course, many more process voltage temperatures (PVTs) may be used. At operation 330, according to different PVT Delta-T distribution data, Delta-T thresholds caused by PVT variation can be calculated. As an example, with reference to the graph 350, for a wide range of temperatures (e.g., 0° C. between 100° C.), a top Delta-T threshold 360 is calculated (e.g., at 100° C.) and a bottom Delta-T threshold 362 is calculated (e.g., at 0° C.) and multitude of PVT Delta-T data 352 therebetween (at different temperatures) may be calculated.

Based upon this, at operation 340, for each tile, during the testing for a Trojan, the process can determine whether the Delta-T from the potential Trojan design, goes beyond the Delta-T threshold.

An example equation that may be used for calculating whether the Delta-T threshold is exceeded may be:

$$\text{Delta-}T > \text{delta\_}t\_\text{threshold}$$

In this equation, Delta-T may be defined by the function equation:

$$\text{Delta-}T = F(\text{Pref}^* e^{alpha^*T})$$

In this equation: Pref is reference leakage power at 25° for each tile; and in $e^{alpha^*T}$—alpha is a technology dependent constant, and T is the absolute temperature in Celsius under an overheating condition. Further, in this equation, delta_t_threshold=max(PVT_Var_Delta_t_threshold, sensor resolution). Therefore, this formula (Delta-T>delta_t_threshold) indicates that the detection sensitivity of the potential Trojan IC depends upon the elevated temperature and the potential Trojan IC gates percentage.

In particular, for each tile, during the testing for a Trojan, the process can determine whether the Delta-T from the potential Trojan design, goes beyond the Delta-T threshold (i.e., Delta-T>delta_t_threshold), to indicate that a Trojan is present beyond possible temperature changes from process variations.

One example implementation of calculating Delta-T differences per tile is described in U.S. patent application Ser. No. 16/709,746, hereby incorporated by reference, however, any suitable method may be used.

Further, in a second scenario, a wire based implementation is used, in which, given a very high temperature condition, the temperature of each wire segment with thermal impact from underneath devices and neighboring wires will be calculated for both a golden IP core/IC and an IP core/IC under test (e.g., that may be a malicious IP core). In the second scenario, a Trojan may be inserted by changing the metal layers. A modified per wire temperature on a malicious IP core/IC can be obtained to detect the metal manipulations by comparison with the wire temperature on the golden IP core/IC.

Figure 4:
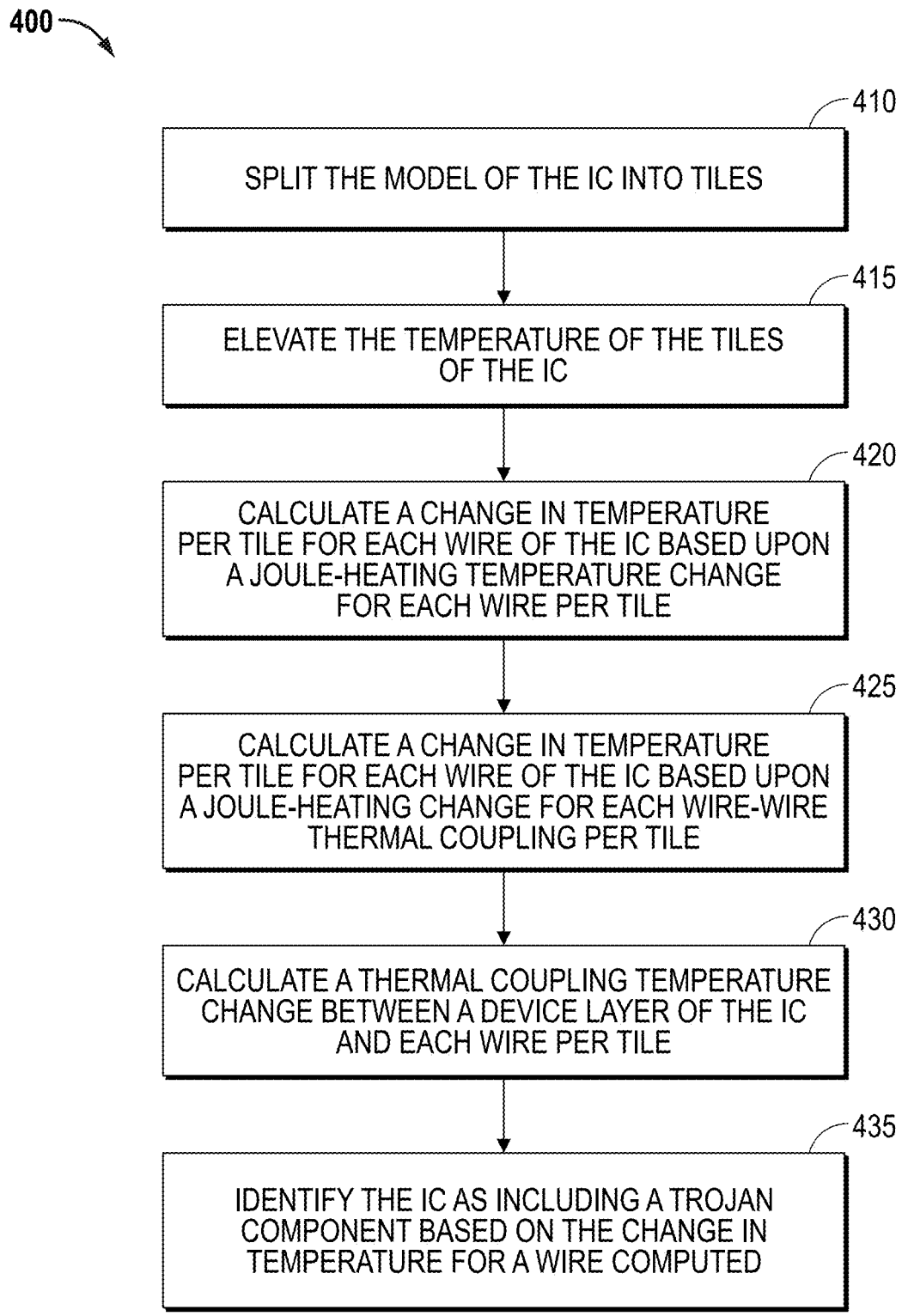
FIG. 4 shows a flow chart of a method to determine if a Trojan component is present according to one embodiment.

With reference to FIG. 4, operation steps of a method 400 of scenario 2 in a flowchart will be described, to illustrate a method to determine if a model of an integrated circuit (IC) having a device layer and a plurality of wires includes a Trojan component. At operation 410, the model of the IC is split into tiles. At operation 415, the IC is simulated with an elevated temperature (elevated temperatures of the tiles of the IC). At operation 420, a change in temperature per tile for each wire of the IC is calculated based upon a joule-heating temperature change for each wire per tile. At operation 425, a change in temperature per tile for each wire of the IC based upon a joule-heating temperature change for a wire-wire thermal coupling per tile is calculated. Further, at operation 430, a thermal coupling temperature change between a device layer of the IC and each wire per tile is calculated. At operation 435, a tile of the IC is identified as including a Trojan component based on the change on the computed change in the temperature of a wire.

In one embodiment, the IC is split into uniform tiles. As will be described, in one embodiment, the thermal coupling temperature change between the device layer of the IC and each wire is computed based upon a decay curve. Further, in one embodiment, the calculation of the final Delta-T for each wire per tile is calculated based on a summation of the Delta-T for each wire, the Delta-T wire-wire coupling for each wire, and the Delta-T device to wire for each wire. Based upon this, for each tile, if the change in the temperature for a wire computed based upon the summation compared against a golden IP core, exceeds a predetermined threshold, the wire of the tile of the IC is identified as including a Trojan component. In one embodiment, significant changes in temperature beyond possible temperature changes from process variation are detected for detecting a Trojan.

Figure 5A:
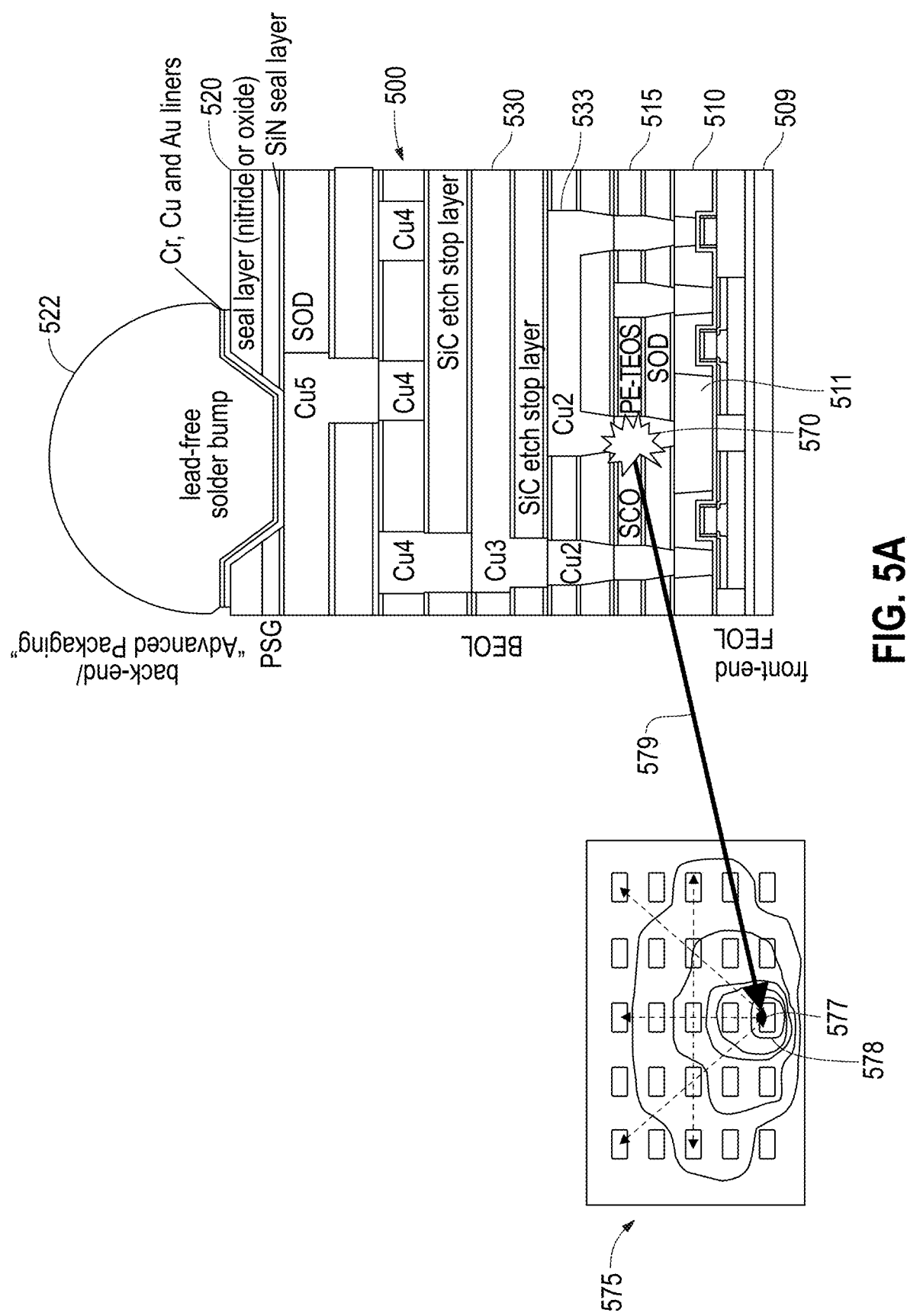
FIG. 5A shows an example of an IP core having a device layer and a plurality of wires being tested to determine if a Trojan component exists according to one embodiment.

With additional reference, to FIG. 5A, an example of an IP core/IC via simulation being tested is shown to determine if a model of the IP core/IC having a device layer and a plurality of wires includes a Trojan component. As can be seen in FIG. 5A, a side view of tile 500 of the IP core is shown. The tile 500 may include a substrate 509, a device layer 510, a plurality of layers 515, a top seal layer 520, and a solder bump 522. In particular, as can be seen, a plurality of wires 530 are present in the layers 515, and some wires 533, in particular are connected to the device layer 510.

As has been described, the operation steps of scenario 2 to determine if a model of the IP core/IC having a device layer 510 and a plurality of wires 530 includes a Trojan includes elevating the temperature of the tiles 500 of the IP core. In these operations, a change in temperature per tile for each wire 530 of the IP core is calculated based upon a joule-heating temperature change for the wire 530 per tile 500. Further, a change in temperature per tile for each wire 530 of the IP core based upon a joule-heating temperature change for a wire-wire thermal coupling is calculated. Also, a device layer per tile Delta-T is calculated (static and transient). Example implementations of this are described in U.S. patent application Ser. Nos. 16/709,746 and 16/730,421, hereby incorporated by reference, however, any suitable implementation may be used. Additionally, a thermal coupling temperature change between the device layer 512 of the IP core and each wire 530 per tile 500 is calculated. As will be described, in one embodiment, the thermal coupling temperature change between the device layer 510 of the IP core and the wire 530 may be computed based upon a decay curve. A tile 500 of the IP core may be identified as including a Trojan component based on the computed change in the temperature of a wire 530.

In one embodiment, the calculation of the final Delta-T for each wire 530 per tile 500 is calculated based on a summation of the Delta-T for a wire 530, the Delta-T wire-wire coupling for a wire 530, and the Delta-T device to wire for a wire 530. Based upon this, for each tile 500, if the change in the temperature for a wire 530 computed based upon the summation compared against a golden IP core, exceeds a predetermined threshold, the wire 530 of the tile 500 of the IP core may be identified as including a Trojan component.

Looking at a particular implementation, a description of wire 533 calculation will be described hereafter. Wire 533 in tile 500 is connected to the device layer 510. As has been described, to determine if a model of the IP core/IC having a device layer 510 and a plurality of wires 530 includes a Trojan includes elevating the temperature of the tile 500 of the IP core. For example, in this operation, a change in temperature for a wire 530 in tile 500 of the IP core is calculated based upon a joule-heating temperature change for the wire 530. Further, a change in temperature for a wire 530 in tile 500 of the IP core based upon a joule-heating temperature change for a wire-wire thermal coupling is calculated.

It should be appreciated that any suitable method of calculating a joule-heating temperature change for each wire 530 and a change in temperature for each wire 530 of the IP core based upon a joule-heating temperature change for wire-wire thermal coupling per tile may be utilized. One example implementation is described in U.S. Pat. No. 10,579,757, hereby incorporated by reference, however, any suitable method may be used. In particular, thermal modeling for wire/via details inside a chip design which includes thermal effects of wires with Joule heating and devices with self-heat, is known. The model can be informed, at least based in part, through temperature observation and measurement of real world chips to ascertain aspects of their behavior in certain configurations (e.g., using real-world, physical temperature measurements of a chip to train the model). In particular, thermal finite element (FE) sub-modeling can be implemented. The sub-modeling is referring to a partial area range of a chip design proper for efficient FE solution. In particular, T-rise calculation on wires can be calculated. This can be achieved by assigning isothermal boundary conditions, e.g., 70° C., on top of the top layer and on the bottom of the Si substrate while the other four sides of the sub-model left as insulated. The T-rise on each wire is the difference of the resulting wire temperature and the prescribed BC at constant temperature. Although, this is one example, it should be appreciated that any suitable method of calculating a joule-heating temperature change for each wire 530 per tile and a change in temperature for each wire 530 of the IP core based upon a joule-heating temperature change for wire-wire thermal coupling per tile, may be utilized.

Further, as has been described, a thermal coupling temperature change between the device layer 512 of the IP core and each wire 530 per tile 500 is calculated. As will be described, in one embodiment, the thermal coupling temperature change between the device layer 512 of the IP core and each wire 530 may be calculated based upon a decay curve. Therefore, as has been described, the calculation of the final Delta-T for a wire 530 (for each wire) per tile 500 is calculated based on a summation of the Delta-T for the wire, the Delta-T wire-wire coupling for the wire, and the Delta-T device to wire for the wire.

In this instance, as an example, the calculation of the final Delta-T for wire 533 is calculated based on a summation of the Delta-T for wire 533, the Delta-T wire-wire coupling for wire 533, and the Delta-T device to wire for the wire 533. As can be seen by the star marking 570, at this wire position, it can be seen there is a large increase in temperature, and that the change in the temperature for the wire 533 computed based upon the summation compared against a golden core, exceeds a predetermined threshold, and the wire 533 of the tile 500 of the IP core is identified as including a Trojan component. In particular, as an example, as can be seen in the side illustration of FIG. 5A, that shows a heat map 575, it can be seen in heat map 575 that heat point 577 pointed to by line 579 from star marking 570 that a sizeable Delta-T device to wire (between wire 533 and device 511 and device layer 510) has occurred in combination with Delta-T for wire 533 and Delta-T wire-wire coupling for wire 533. As shown in heat map 575, approximately oval shaped heat regions extend outward from the heat point 577. A main heat region 578 surrounds heat point 577 and descending heat regions extend outward from the main heat region 578. Therefore, this is a particular example that illustrates for a tile 500, if the change in the temperature (e.g., indicated by star marking 570 and heat map 575) for a particular wire 533 computed based upon the summation (Delta-T device to wire, Delta-T wire, and Delta-T wire-wire coupling) compared against a golden IP core, exceeds a predetermined threshold, the wire 533 of the tile of the IP core may be identified as including a Trojan component.

Therefore, as has been described, the operation steps of scenario 2 to determine if a model of the IP core/IC having a device layer 510 and a plurality of wires 530 includes a Trojan includes elevating the temperature of the tiles 500 of the IP core. In these operations, a change in temperature per tile for each wire 530 of the IP core is calculated based upon a joule-heating temperature change for the wire 530 per tile 500. Further, a change in temperature per tile for each wire 530 of the IP core based upon a joule-heating temperature change for a wire-wire thermal coupling per tile is calculated. Additionally, a thermal coupling temperature change between the device layer 510 of the IP core and each wire 530 per tile 500 is calculated. A tile 500 of the IP core is identified as including a Trojan component based on the change on the computed change in the temperature of a wire 530. In one embodiment, the calculation of the final Delta-T for each wire 530 per tile 500 is calculated based on a summation of the Delta-T for a wire 530, the Delta-T wire-wire coupling for a wire 530, and the Delta-T device to wire for a wire 530. Based upon this, for each tile 500, if the change in the temperature for a wire 530 computed based upon the summation compared against a golden IP core, exceeds a predetermined threshold, the wire 530 of the tile 500 of the IP core is identified as including a Trojan component. A particular example that illustrates this for tile 500, for particular wire 533 has been provided, wherein, the change in the temperature (e.g., indicated star marking 577 and heat map 575) for a particular wire 533 computed based upon the summation compared against a golden core, exceeds a predetermined threshold, such that the wire 533 of the tile of the IP core is identified as including a Trojan component.

Figure 5B:
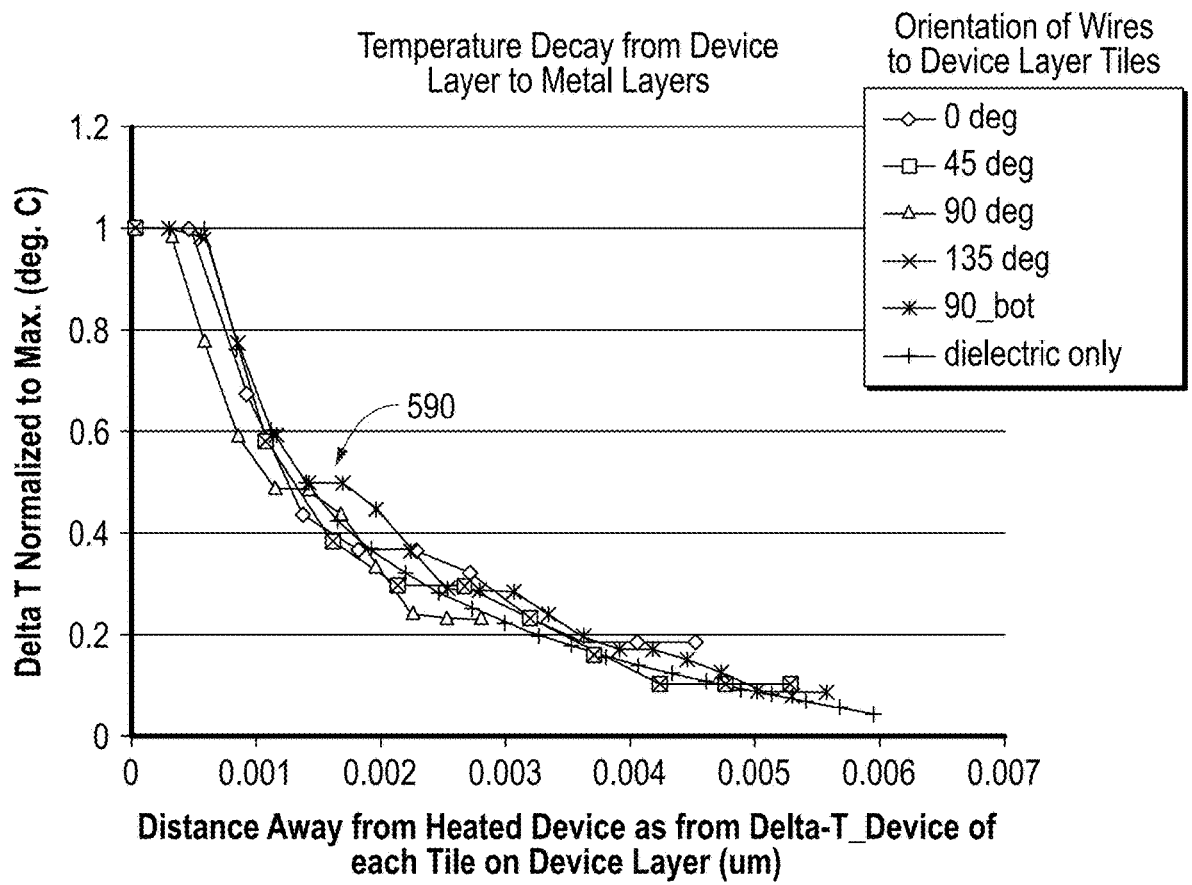
FIG. 5B shows an example graph of temperature decays from the device layer to metal wires according to one embodiment.

It should be noted that, in one embodiment, the thermal coupling temperature change between the device layer 510 of the IP core and a wire 530 may be computed based upon a decay curve. In particular, due to the thermal coupling decay curve most of the heat source impact from the device layer 510 (characterized as tile-based Delta-T device) to the metal wire 530 will be quickly decayed (e.g., beyond 5 um). Therefore, the amount of calculations for thermal couplings for every wire for Delta-T device for every tile is reduced. With reference to FIG. 5B, this can be seen. FIG. 5B shows temperature decay from the device layer 510 to metal wires 530. In particular, y-axis of FIG. 5B is the change in temperature normalized to max and the x-axis shows the distance away from the heated device as from Delta-T device of each tile on the device layer (in um). As can be seen in the graph lines 590, despite the angular orientation of the metal wires to the device layer, the temperatures of the wires similarly decrease substantially with distance. In particular, FIG. 5B shows most of the heat source impact from the device layer to the metal wire will be quickly decayed (e.g., beyond 5 um)

Figure 6:
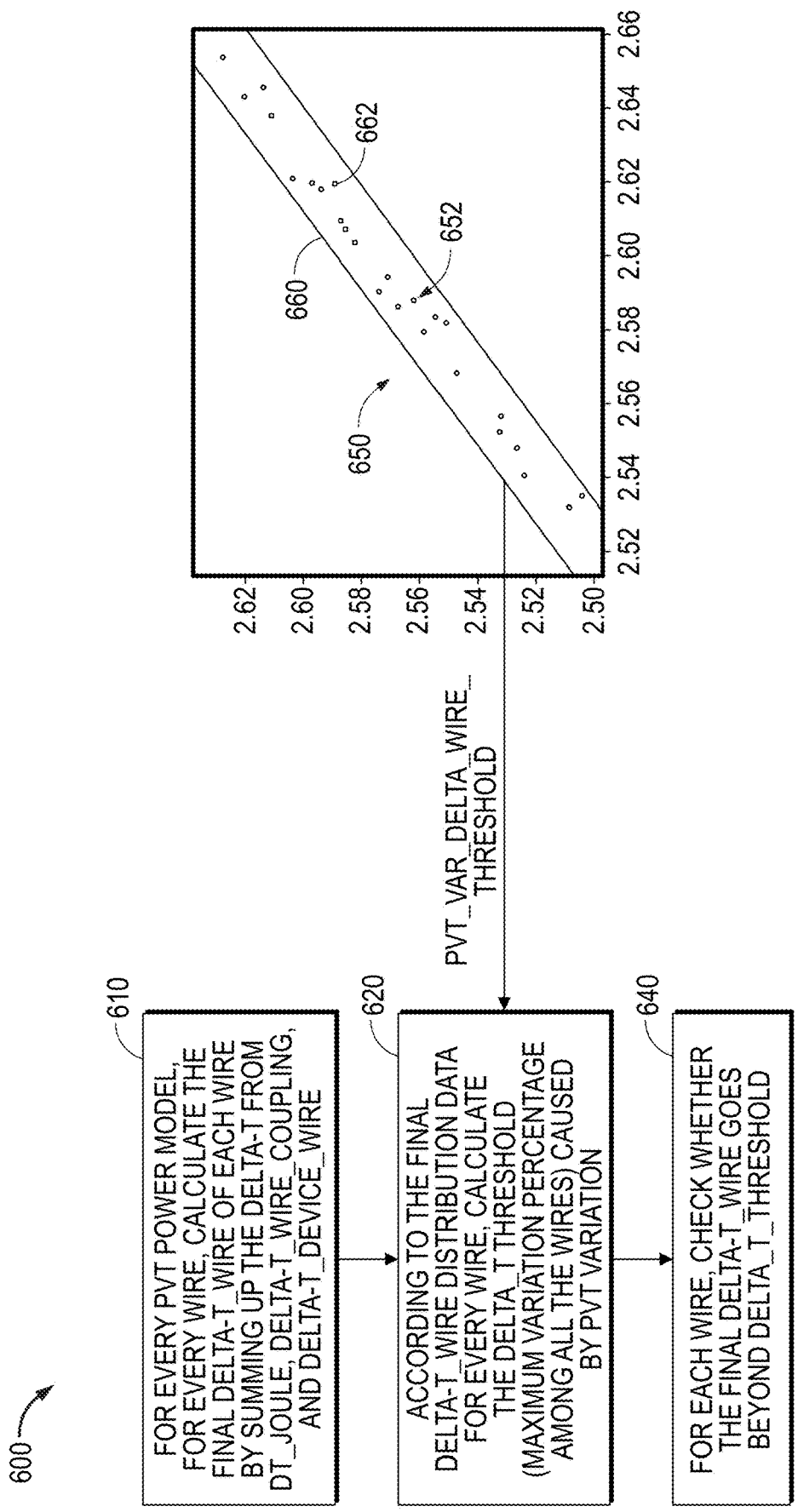
FIG. 6 shows a flowchart and a graph that illustrate a method to detect for significant Delta-T wire temperature differences beyond possible temperatures changes from process variation according to one embodiment.

With reference to FIG. 6, FIG. 6 shows a flowchart and a graph that illustrate a method 600 to detect for significant Delta-T wire temperature differences beyond possible temperatures changes from process variation for confirming a Trojan. At operation 610, for every process voltage temperature (PVT) chip power model performed, for every wire, the summed calculation of the Delta-T for each wire, the Delta-T wire-wire coupling for each wire, and the Delta-T device to wire for each wire, is performed, as previously described. At operation 620, according to the final Delta-T wire distribution data for every wire, the Delta-T threshold (maximum variation percentage among all wires) is calculated caused by PVT variation. As an example, with reference to the graph 650, for a wide range of temperatures (e.g., 0° C. between 100° C.), a top Delta-T threshold 660 is calculated (e.g., at 100° C.) and a bottom Delta-T threshold 662 is calculated (e.g., at 0° C.) and multitude of PVT Delta-T data 652 therebetween (at different temperatures) may be calculated.

Based upon this, at operation 640, for each wire, during the testing for a Trojan, the process can determine whether the Delta-T from the potential Trojan design, goes beyond the Delta-T threshold.

An example equation that may be used for calculating whether the Delta-T threshold is exceeded may be:

$$\text{Delta-}T\_wire > \text{delta}\_t\_threshold$$

In this equation, delta_t_threshold=max(PVT_Var_T_wire_threshold, sensor resolution). Therefore, this formula (Delta-T_wire>delta_t_threshold) indicates that the detection sensitivity of the potential Trojan IC depends upon the elevated temperature of the wire and the potential Trojan IC gates percentage. The elevated temperature can be progressively increased in simulation until the Trojan can be detected. If the temperature is elevated to a very high value, a trojan IC can even be detected with a very small gate percentage. In particular, for each wire, during the testing for a Trojan, the process can determine whether the Delta-T_wire from the potential Trojan design, goes beyond the Delta-T_wire threshold (i.e., Delta-T_wire>delta_t_threshold), to indicate that a Trojan implemented by the wire is present beyond possible temperature changes from process variations.

Therefore, as has been described, in scenario 2, a wire based implementation is used, in which, given a very high temperature condition, the temperature of each wire segment with thermal impact from underneath devices and neighboring wires will be calculated for both a golden IP core and an IP core under test (e.g., that may be a malicious IP core). In the second scenario, a Trojan may be inserted by changing the metal layers. A modified per wire temperature on a malicious IP core can be obtained to detect the metal manipulations by comparison with the wire temperature on golden IP core. As one particular example, the calculation of the final Delta-T for each wire per tile is calculated based on a summation of the Delta-T for the wire, the Delta-T wire-wire coupling for the wire, and the Delta-T device to wire for the wire. Based upon this, for each tile, if the change in the temperature for a wire computed based upon the summation compared against a golden IP core, exceeds a predetermined threshold, the wire of the tile of the IP core is identified as including a Trojan component.

Both previously described scenario 1 and scenario 2, provide third party IP core authentication efficiently and comprehensively to identify potential Trojans. For example, scenario 1 provides a novel method to produce a tile-based leakage power based Delta-T map on each IP core/IC for efficiently identifying malicious Trojans where the Trojans can be inserted on the unused and/or filler regions. Further, for example, scenario 2 provides a novel method to identify metal modification on the third party IP core/IC under test with fast calculation of Delta-T wire from the thermal coupling of underneath devices and neighboring wires which cannot be detected with the existing methodology.

Simulations can use the aspects and embodiments described herein. The user or designer can evaluate the results of one or more simulations to determine whether the design of the IC satisfies certain desired criteria for the design. For example, a user or designer can determine whether it is too easy to detect secret data (e.g., keys, sensitive data, etc.) in the device from current results. If one or more criteria is satisfied, then the user or designer may provide data about the circuit to allow for the fabrication or manufacture of the IC or system or not allow for the fabrication or manufacture of the IC or system and provide changes. For example, if the one or more criteria is satisfied, one or more CAD files can be produced that describe how to build the IC or system. If the criteria are not satisfied, the designer can revise the design (for example, by applying known countermeasures on identified leaky instances or by changing sizes and/or quantity of the power distribution network, etc.) and repeat the process by performing additional further simulations to evaluate the redesigned circuit. Thus, the embodiments described herein can be used repeatedly during the redesigning process to evaluate the adequacy of the countermeasures that can be applied during the redesigning process. This can be repeated until the desired criteria are achieved for the circuit.

The embodiments described herein improve upon standard techniques for verifying the level of protection afforded to secret data (such as cryptographic keys) by using techniques that improve the speed of simulations and reduce the computational complexity of the simulations, thereby improving the operation of a data processing system (e.g., a computer) performing the simulations and other operations. Moreover, these techniques provide more accurate results more quickly, efficiently, and at less cost. It will be understood that secret data or sensitive data can be in various different forms or types, including, for example, passwords, account numbers, account names, hashes, keys of various different types (files keys, device keys), device identifiers, etc.

Figure 7:
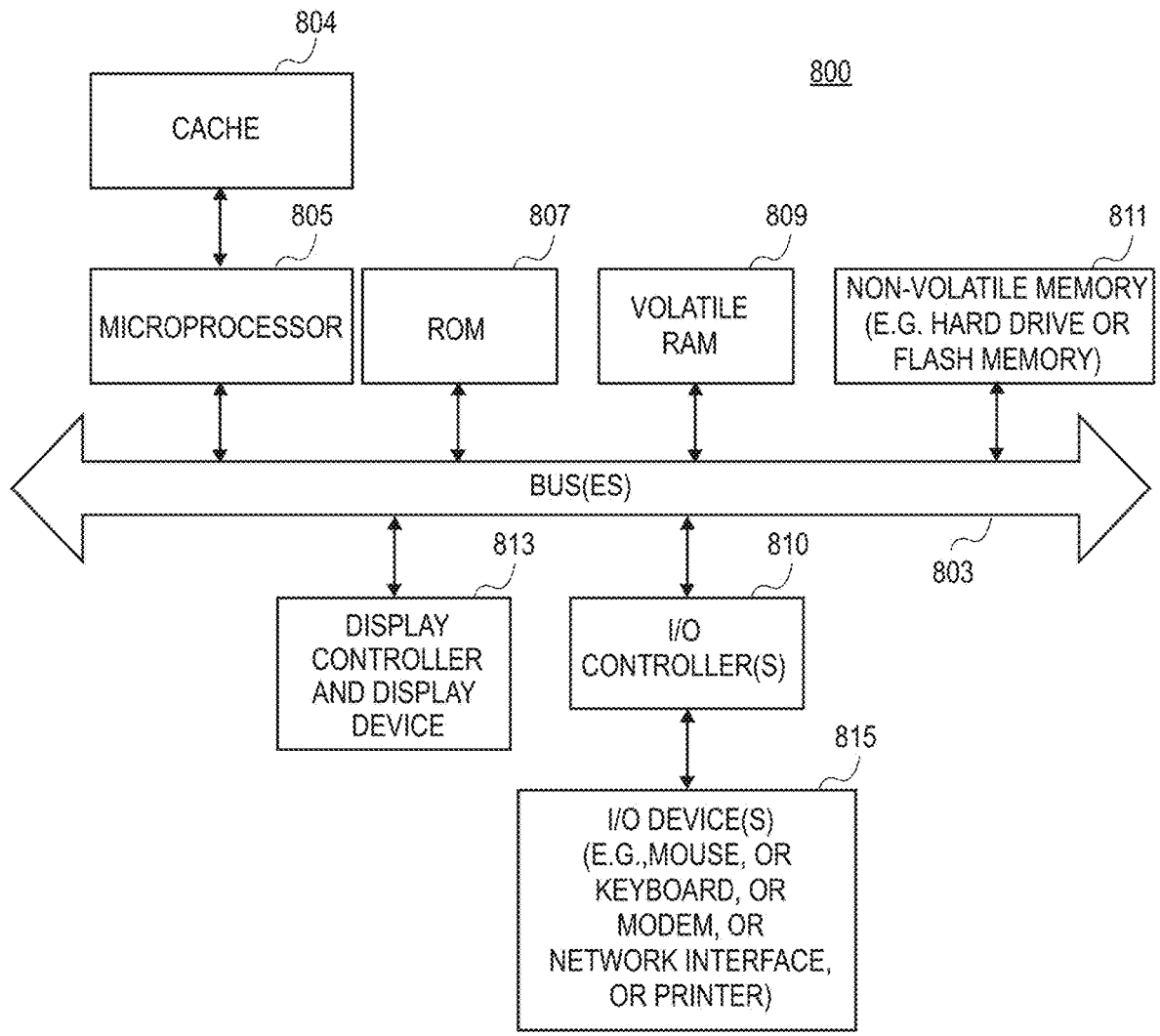
FIG. 7 shows an example of a data processing system that can be used to implement one or more embodiments described herein.

FIG. 7 shows one example of a data processing system 800, which may be used with one embodiment. For example, the system 800 may be implemented to provide a computer system or device that performs any one of the methods shown (e.g., FIGS. 1-6) or described herein. Note that while FIG. 7 illustrates various components of a device, it is not intended to represent any particular architecture or manner of interconnecting the components as such details are not germane to the disclosure. It will also be appreciated that network computers and other data processing systems or other consumer electronic devices, which have fewer components or perhaps more components, may also be used with embodiments of the disclosure.

As shown in FIG. 7, the device 800, which is a form of a data processing system, includes a bus 803 which is coupled to a microprocessor(s) 805 and a ROM (Read Only Memory) 807 and volatile RAM 809 and a non-volatile memory 811. The microprocessor(s) 805 may retrieve the instructions from the memories 807, 809, 811 and execute the instructions to perform operations described above. The microprocessor(s) 805 may contain one or more processing cores. The bus 803 interconnects these various components together and also interconnects these components 805, 807, 809, and 811 to a display controller and display device 813 and to peripheral devices such as input/output (I/O) devices 815 which may be touchscreens, mice, keyboards, modems, network interfaces, printers and other devices which are well known in the art. Typically, the input/output devices 815 are coupled to the system through input/output controllers 810. The volatile RAM (Random Access Memory) 809 is typically implemented as dynamic RAM (DRAM), which requires power continually in order to refresh or maintain the data in the memory.

The non-volatile memory 811 is typically a magnetic hard drive or a magnetic optical drive or an optical drive or a DVD RAM or a flash memory or other types of memory systems, which maintain data (e.g., large amounts of data) even after power is removed from the system. Typically, the non-volatile memory 811 will also be a random access memory although this is not required. While FIG. 7 shows that the non-volatile memory 811 is a local device coupled directly to the rest of the components in the data processing system, it will be appreciated that embodiments of the disclosure may utilize a non-volatile memory which is remote from the system, such as a network storage device which is coupled to the data processing system through a network interface such as a modem, an Ethernet interface or a wireless network. The bus 803 may include one or more buses connected to each other through various bridges, controllers and/or adapters as is well known in the art.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The disclosure also relates to an apparatus for performing the operations described herein. This apparatus may be specially constructed for the required purpose, or it may comprise a general-purpose device selectively activated or reconfigured by a computer program stored in the device. Such a computer program may be stored in a non-transitory computer readable storage medium, such as, but not limited to, any type of disk including floppy disks, optical disks, CD-ROMs, and magnetic-optical disks, DRAM (volatile), flash memory, read-only memories (ROMs), RAMs, EPROMs, EEPROMs, magnetic or optical cards, or any type of media suitable for storing electronic instructions, and each coupled to a device bus.

A machine readable medium includes any mechanism for storing information in a form readable by a machine (e.g., a computer). For example, a non-transitory machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more non-transitory memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)) and then stored in non-transitory memory (e.g., DRAM or flash memory or both) in the client computer.

The preceding detailed descriptions are presented in terms of algorithms and symbolic representations of operations on data bits within a device memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "determining," "sending," "terminating," "waiting," "changing," or the like, refer to the action and processes of a device, or similar electronic computing device, that manipulates and transforms data represented as physical (electronic) quantities within the device's registers and memories into other data similarly represented as physical quantities within the device memories or registers or other such information storage, transmission or display devices.

The processes and displays presented herein are not inherently related to any particular device or other apparatus. Various general-purpose systems may be used with programs in accordance with the teachings herein, or it may prove convenient to construct a more specialized apparatus to perform the operations described. The required structure for a variety of these systems will be evident from the description below. In addition, the disclosure is not described with reference to any particular programming language. It will be appreciated that a variety of programming languages may be used to implement the teachings of the disclosure as described herein.

In the foregoing specification, specific exemplary embodiments have been described. It will be evident that various modifications may be made to those embodiments without departing from the broader spirit and scope set forth in the following claims. The specification and drawings are, accordingly, to be regarded in an illustrative sense rather than a restrictive sense.

What is claimed is:

1. A machine implemented method to determine if a model of an integrated circuit (IC) includes a Trojan component, the method comprising:
   splitting the model of the IC into a plurality of tiles;
   simulating the IC with an elevated temperature of each tile to a predetermined level;
   computing a temperature-dependent leakage power based on a pre-silicon simulation for each tile; and
   identifying a tile of the IC as including a Trojan component based on the temperature-dependent leakage power computed.

2. The method as in claim 1, wherein the IC is split into uniform tiles.

3. The method as in claim 1, wherein the temperature of the whole IC including all of the tiles is increased to the predetermined level.

4. The method as in claim 3, wherein, for each tile, a change in temperature based upon the leakage power is computed and compared against a golden IP core, and if the change in temperature exceeds a predetermined threshold, the tile of the IC is identified as including a Trojan component.

5. The method as in claim 4, wherein, significant changes in temperature beyond possible temperature changes from process variation are detected.

6. A non-transitory machine readable medium storing executable program instructions which when executed by a data processing system cause the data processing system to perform a method to determine if a model of an integrated circuit (IC) includes a Trojan component, the method comprising:
   splitting the model of the IC into a plurality of tiles;
   simulating the IC with an elevated temperature of each tile to a predetermined level;
   computing a temperature-dependent leakage power based on a pre-silicon simulation for each tile; and
   identifying a tile of the IC as including a Trojan component based on the temperature-dependent leakage power computed.

7. The medium as in claim 6, wherein the IC is split into uniform tiles.

8. The medium as in claim 6, wherein the temperature of the whole IC including all of the tiles is increased to the predetermined level.

9. The medium as in claim 8, wherein, for each tile, a change in temperature based upon the leakage power is computed and compared against a golden IP core, and if the temperature exceeds a predetermined threshold, the tile of the IC is identified as including a Trojan component.

10. The medium as in claim 9, wherein, significant changes in temperature beyond possible temperature changes from process variation are detected.

11. A method to determine if a model of an integrated circuit (IC) having a device layer and a plurality of wires includes a Trojan component, the method comprising:
   splitting the model of the IC into tiles;
   simulating the IC with an elevated temperature;
   calculating a change in temperature per tile for a wire of the IC based upon a joule-heating temperature change for the wire per tile, a change in temperature per tile for the wire of the IC based upon a joule-heating temperature change for a wire-wire thermal coupling per tile, and a thermal coupling temperature change between a device layer of the IC and the wire per tile; and
   identifying the IC as including a Trojan component based on the change in temperature for the wire computed.

12. The method as in claim 11, wherein the IC is split into uniform tiles.

13. The method as in claim 11, the thermal coupling temperature change between the device layer of the IC and the wire is computed based upon a decay curve.

14. The method as in claim 13, wherein, for each tile, if the change in the temperature for the wire computed compared against a golden IP core, exceeds a predetermined threshold, the wire of the tile of the IC is identified as including a Trojan component.

15. The method as in claim 14, wherein, significant changes in temperature beyond possible temperature changes from process variation are detected.

16. A non-transitory machine readable medium storing executable program instructions which when executed by a data processing system cause the data processing system to perform a method to determine if a model of an integrated circuit (IC) having a device layer and a plurality of wires includes a Trojan component, the method comprising:
   splitting the model of the IC into tiles;
   simulating the IC with an elevated temperature;
   calculating a change in temperature per tile for a wire of the IC based upon a joule-heating temperature change for the wire per tile, a change in temperature per tile for the wire of the IC based upon a joule-heating temperature change for a wire-wire thermal coupling per tile, and a thermal coupling temperature change between a device layer of the IC and the wire per tile; and
   identifying the IC as including a Trojan component based on the change in temperature for the wire computed.

17. The medium as in claim 16, wherein the IC is split into uniform tiles.

18. The medium as in claim 16, the thermal coupling temperature change between the device layer of the IC and the wire is computed based upon a decay curve.

19. The medium as in claim 18, wherein, for each tile, if the change in the temperature for the wire computed compared against a golden IP core, exceeds a predetermined threshold, the wire of the tile of the IC is identified as including a Trojan component.

20. The medium as in claim 19, wherein, significant changes in temperature beyond possible temperature changes from process variation are detected.

* * * * *